May 16, 1950      R. M. BOWMAN      2,508,011

PENDULUM SCALE

Filed April 21, 1947

Inventor
REGINALD M. BOWMAN.

By Howard J. Whelan.

Attorney

Patented May 16, 1950

2,508,011

UNITED STATES PATENT OFFICE 2,508,011

PENDULUM SCALE

Reginald M. Bowman, Baltimore, Md.

Application April 21, 1947, Serial No. 742,899

2 Claims. (Cl. 265—61)

This invention refers to weighing equipment and more particularly to the smaller types of scales used for domestic, store, diet, and postage purposes.

The general type of scales used for the weighing of light quantities of materials have various forms that require springs of some nature or kind or adjustable weights manipulated on a bar or the like to suit the various items to be weighed. The springs have the disadvantage of wearing out or becoming strained sufficiently to render their accuracy questionable. The adjustment of weights in the other instances, for weighing purposes, requires manual adjustment that takes up time, and depends greatly on the personal judgment and eyesight of the operator. This invention avoids the employment of springs and the use of adjustable weights. It provides instead scales that can be accurately set at the beginning and afterwards retain their accuracy without involving changes in the parts or structure of the device.

It is therefore an object of this invention to provide a new and improved scale that will avoid the use of springs and adjustable weights in its regular operation.

Another object of the present invention is to provide new and improved scales that will avoid complicated mechanisms in their structure and be relatively simple yet at the same time being effective and easy to use.

A further object of the invention is to provide a new and improved scales that will be suitable for the weighing of small articles and be suitable for use on a table or horizontal place, while at the same time, be capable of having a sturdy construction easy to use during the weighing, and reading directly on its weighing structure.

Other objects will become apparent as the invention is further described.

For a better appreciation of the invention and its objects, reference is made to the appended drawings and the following specifications, which together detail a particular structure of the invention by way of example, while the scope of the invention and the principles thereof can be discerned in the claims.

In the particular form of the invention shown in the drawings.

Similar reference characters refer to similar parts throughout the drawings.

Figure 2:
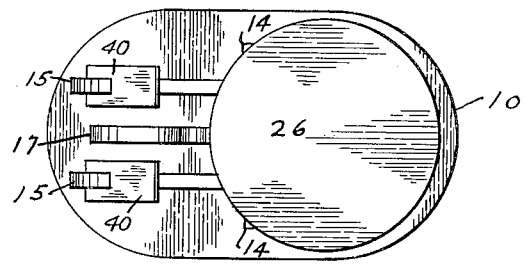
Figure 2 is a plan view of Figure 1.

The particular construction illustrated, consists of a small table scales suitable for weighing postage matter, and has a base 10 with flat upper and under surfaces to enable it to rest evenly on a horizontal table or platform surface. A yoke frame member is mounted vertically on the base and has two symmetrical side walls 12 spaced apart sufficiently to allow a flattened swinging balance pendulum 13 to operate freely in between them through a predetermined arcuate travel. Side brackets 14 support the walls 12 in an upright position and are mounted exteriorly thereto on the upper surface of the base 10. The extended bottom portions 15 of the walls spread out across the base 10 and produce a substantial foundation for the walls to set on and prevent their overturning, even with the items to be weighed, on the scale. These extended portions 15 are preferably arcuately enlarged and serve to protect the curved protrusions 16 and 17, respectively to the front and back of the pendulum 13. The stem 18 of the pendulum is attached to the weighted protrusions 16 and 17 where they come together adjacent a weight 20 set permanently in the structure of the pendulum. The stem 18 is normally offset outside the axial plane of the walls 12 and formed with its upper portion 19 at an angle towards the front of the scales. The stem 18 is supported on an axle 25 having its end portions pointed and held in journals 22, which are adjustable in the walls 12. A cross bar 23 is threadably arranged in between the walls 12 to hold them together against spreading in a suitable manner. The stem 18 supports a channel shank 24 on its end portion by means of a pin 21, that is loose enough to allow shank 24 to adjust itself to a vertical position, as it rises or lowers during its travel. The shank 24 has a weighing plate 26 rigidly secured on its top in a normally horizontal position. A link 27 fastens the walls 12 and the lower portion of the shank 24 to keep the latter in vertical alignment as it travels up and down and adjusts itself on the pins 21 and 28 as it does so. The axle 29 is supported in journals 38. The markings or indices 30 placed on the protrusions 16 and 17 on the pendulum 13 indicate the amount of the weights placed on the plate 26 when the particular markings register with a fixed indicator 40 mounted on the bottom portion 15 of the walls 12. The protrusions 16 and 17 together form an arcuate contour and are faced flat to enable the indices of the markings to show clearly. The position of each index in relation to the indicator 40 as it aligns therewith, shows the value of the item weighed in suitable units. In this instance, a postage rate is marked and gives the amount of postage directly, for the item that is placed on the plate 26. As the pendulum 13 swings on its axle 25 when the shank 24 travels down under the weight of the object on the plate 26, it exerts sufficient leverage on the rest of the pendulum to rotate the bottom portion so the protrusions 16 and 17 will travel through an arc towards the left carrying the weight 20 out of its neutral and balanced position to a position that will cause it to balance the item on the plate 26. The more weight placed on the plate 26, the more it will displace the pendulum 13 and its weight 20 thereon, from its normal placement. This action will also keep the main center of gravity of the scales acting along the same line at the same time, even as the weight on the plate 26 is varied. The channel shank 24 is arranged on one side of the vertical axis of the yoke member 11 while the weight 20 is acting on the opposite side to keep the center of gravity situated as described. As the weighing plate 26 lowers on the scales the pendulum protrusions 16 and 17 are moved away from under the plate, so they will not interfere with the travel of the plate 26 and channel shank 24 downwardly. This enables the scales to be of small height and to require less space than otherwise would be the case. The amounts derived during weighing are shown plainly on the arcuate protrusions in the markings 30. The pendulum 13 in acting as it does, shows the working parts in operation in a conspicuous manner so that the user is assured that the device is functioning by mere observation. The scale has another feature of interest in that it affords a facile way for determining its level and whether it is properly set for use. When the scale is out of level, the pendulum moves out of line and its markings 30 register similarly, out of line, with the indicator. The base is levelled by the user, until the indicator 27 is aligned with the zero or equivalent mark on the pendulum, and means may be used to keep it in that position. This usually requires a suitable lamina inserted under the base 10 to raise it at one end to make it level.

Figure 1:
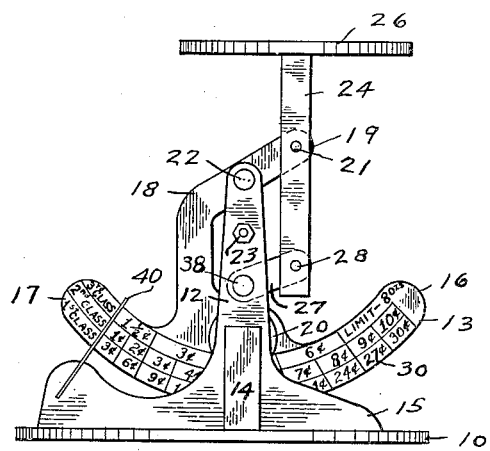
Figure 1 is a side elevation of a scale structure embodying the invention.
Figure 3:
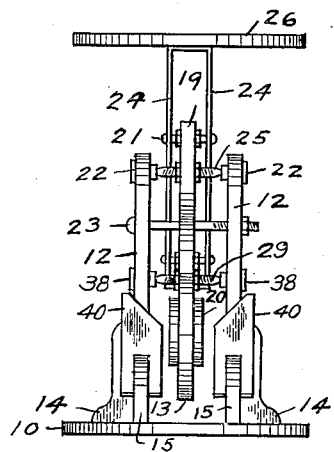
Figure 3 is an end view of Figure 1.
Figure 4:
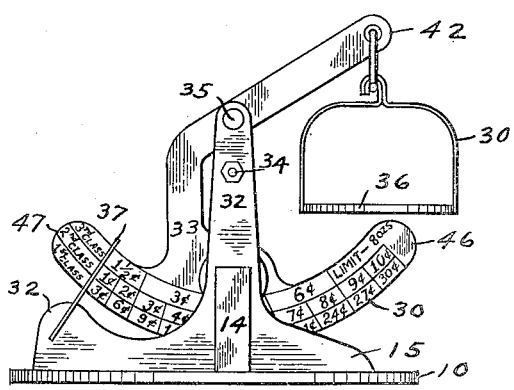
Figure 4 is a modified form of the invention.

In the modified form shown in Figure 4 the weight plate is in the form of a pan 36 suspended on the stem 42 by a harness 30 and without the channel shank. The stem 42 of the pendulum 33 is longer and of a different contour in order to permit the pan or plate 36 to extend further away from it than in the previously described form. For alike practical reason, the framework 32 is arcuately formed to allow the pan 36 to swing towards it without striking. This also places the framework 32 towards the rear of the base 10. This gives an L-shaped outline to the scales, with the pan 36 between the top of the frame and the base 10. The pendulum 33 assumes a contour of arcuate form which is generally similar to that shown at 13 and has similar protrusions 46 and 47 aligned with the contour of the framework 32. The operation is similar to that of the scales shown in Figure 1. When plate 36 is lowered by a weight placed thereon, the protrusion 46 moves out of the way. An adjusting cross bar 34 is used in the framework 32 below the pin 35 that supports the pendulum 33 and serves to keep the walls of the framework suitably rigid and adjusted. The indicator 37 is mounted on the framework 32 so as to register appropriately with the markings 30 on the pendulum.

While but two general forms of the invention are shown in the drawings and described in the specifications it is not desired to limit this application for patent to these particular forms or in any other way otherwise than limited by the scope of the appended claims.

Having thus described the invention, what is claimed is:

1. A weighing scale comprising a base, a frame secured thereto and extending upwardly therefrom, a weighted element, an upward extension on said element, pivot means between said extension and said frame, said weighted element being normally on a vertical axis passing through the pivot point and the center of said weighted element, arcuate extensions on said weighted element extending co-extensively on each side of the center thereof, said extensions bearing weight-indicating indicia, legibile on either side of said element, an indicator cooperating with said indicia, a plate to support articles to be weighed, a stem connected to said plate and pivot means between said stem and said aforementioned extension.

2. A weighing scale comprising a base, a frame secured thereto and extending upwardly therefrom, a weighted element, an upward extension on said element, means on said frame for pivotally connecting said weighted element to said frame, said weighted element being normally on a vertical axis passing through the pivot point and the center of said weighted element, arcuate extensions on said element extending co-extensively on each side of the center thereof, said extensions bearing weight-indicating indicia legibile on either side of said element, an indicator cooperating with said indicia, a plate to support articles to be weighed, a stem connected to said plate and pivot means between said stem and said aforementioned extension and a pivoted link connecting said stem and said frame.

REGINALD M. BOWMAN.

REFERENCES CITED

The following references are of record in the file of this patent:

UNITED STATES PATENTS

| Number | Name | Date |
|---|---|---|
| 373,568 | Richtmann | Nov. 22, 1887 |
| 2,358,877 | Parks | Sept. 26, 1944 |

FOREIGN PATENTS

| Number | Country | Date |
|---|---|---|
| 1,766 | Austria | July 25, 1900 |
| 591,988 | Germany | Jan. 30, 1934 |